United States Patent
Park et al.

(10) Patent No.: US 10,329,423 B2
(45) Date of Patent: Jun. 25, 2019

(54) MODIFIED POLY(ARYLENE ETHER) RESIN COMPOSITION AND MOLDED ARTICLE PRODUCED THEREOF

(71) Applicant: LG CHEM, LTD., Seoul (KR)

(72) Inventors: Nam Jib Park, Daejeon (KR); Sang Ho Lee, Daejeon (KR); Se Yeong Ju, Daejeon (KR); Soo Min Lee, Daejeon (KR); Jong Kuk Choi, Daejeon (KR); Sung Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 283 days.

(21) Appl. No.: 15/320,249

(22) PCT Filed: Feb. 12, 2016

(86) PCT No.: PCT/KR2016/001418
§ 371 (c)(1),
(2) Date: Dec. 19, 2016

(87) PCT Pub. No.: WO2016/144011
PCT Pub. Date: Sep. 15, 2016

(65) Prior Publication Data
US 2017/0198140 A1    Jul. 13, 2017

(30) Foreign Application Priority Data

Mar. 10, 2015  (KR) .......... 10-2015-0033368
Feb. 2, 2016   (KR) .......... 10-2016-0012774

(51) Int. Cl.
| | | |
|---|---|---|
| C08K 5/01 | (2006.01) |
| C08L 23/00 | (2006.01) |
| C08L 23/10 | (2006.01) |
| C08L 23/12 | (2006.01) |
| C08L 23/14 | (2006.01) |
| C08L 25/06 | (2006.01) |
| C08L 25/08 | (2006.01) |
| C08L 51/06 | (2006.01) |
| C08L 53/02 | (2006.01) |
| C08L 71/12 | (2006.01) |
| C08L 77/00 | (2006.01) |
| C08L 77/06 | (2006.01) |

(52) U.S. Cl.
CPC ............ *C08L 77/06* (2013.01); *C08K 5/01* (2013.01); *C08L 23/00* (2013.01); *C08L 23/10* (2013.01); *C08L 23/12* (2013.01); *C08L 23/147* (2013.01); *C08L 25/06* (2013.01); *C08L 25/08* (2013.01); *C08L 51/06* (2013.01); *C08L 53/02* (2013.01); *C08L 71/12* (2013.01); *C08L 71/126* (2013.01); *C08L 77/00* (2013.01); *C08L 2201/08* (2013.01); *C08L 2205/02* (2013.01); *C08L 2205/035* (2013.01); *C08L 2205/06* (2013.01); *C08L 2205/08* (2013.01)

(58) Field of Classification Search
CPC . C08K 5/01; C08L 23/00; C08L 23/10; C08L 23/12; C08L 23/147; C08L 25/06; C08L 25/08; C08L 51/06; C08L 53/02; C08L 71/12; C08L 71/126; C08L 77/00; C08L 77/06; C08L 2201/08; C08L 2205/02; C08L 2205/035; C08L 2205/06; C08L 2205/08
USPC ........................................................ 524/505
See application file for complete search history.

(56) References Cited

U.S. PATENT DOCUMENTS

2009/0146109 A1* 6/2009  Elkovitch ............... C08L 71/12
                                                        252/500
2009/0256119 A1* 10/2009 Bastiaens ................ C08J 3/226
                                                        252/519.33

FOREIGN PATENT DOCUMENTS

| CN | 103724979 A | 4/2014 |
|---|---|---|
| CN | 104277447 A | 1/2015 |
| CN | 104292802 A | 1/2015 |
| CN | 104292803 A | 1/2015 |
| CN | 104292804 A | 1/2015 |
| CN | 104327481 A | 2/2015 |
| CN | 104327482 A | 2/2015 |
| EP | 3093853 A1 | 11/2016 |
| EP | 3156455 A1 | 4/2017 |
| JP | 02269154 A | 11/1990 |
| JP | 04250005 A | 9/1992 |
| JP | 05222286 A | 8/1993 |
| JP | 05-339496 A | 12/1993 |
| JP | 2905226 B2 | 6/1999 |
| JP | 2002-338804 A | 11/2002 |
| KR | 10-2011-0048376 A | 5/2011 |
| KR | 10-2013-0079535 A | 7/2013 |
| KR | 10-2014-0086736 A | 7/2014 |
| KR | 10-2014-0086737 A | 7/2014 |

OTHER PUBLICATIONS

Machine Translation of KR 10-2014-0086737 (Year: 2014).*

* cited by examiner

*Primary Examiner* — Angela C Scott
(74) *Attorney, Agent, or Firm* — Dentons US LLP

(57) ABSTRACT

The present invention relates to a modified poly(arylene ether) resin composition. More particularly, the present invention relates to a modified poly(arylene ether) resin composition including 10 to 40% by weight of a poly(arylene ether) resin, 30 to 70% by weight of a polyamide resin, 1 to 20% by weight of a polyolefin based resin, 1 to 10% by weight of a compatibilizer, and 1 to 20% by weight of an impact modifier, and a molded article manufactured using the same.
The modified poly(arylene ether) resin composition according to the present invention exhibits reduction of property change due to moisture and provides low specific gravity and superior impact strength, heat resistance, and property balance.

13 Claims, No Drawings

MODIFIED POLY(ARYLENE ETHER) RESIN COMPOSITION AND MOLDED ARTICLE PRODUCED THEREOF

CROSS-REFERENCE TO RELATED APPLICATIONS

This application is a National Stage Application of International Application No. PCT/KR2016/001418 filed on Feb. 12, 2016, which claims the benefit of Korean Patent Application No. 10-2015-0033368 filed on Mar. 10, 2015 and Korean Patent Application No. 10-2016-0012774 filed on Feb. 2, 2016, all of which are hereby incorporated by reference in their entirety for all purposes as if fully set forth herein.

TECHNICAL FIELD

The present invention relates to a modified poly(arylene ether) resin composition, and more particularly to a modified poly(arylene ether) resin composition exhibiting reduction of property change due to moisture and providing low specific gravity and superior impact strength, heat resistance, and property balance, and a molded article manufactured using the same.

BACKGROUND ART

A poly(arylene ether) resin, as an amorphous resin, has superior dimensional stability, insulation performance, heat resistance, rigidity, and the like, and thus, is widely used in a variety of fields such as components for vehicles and components for electrical and electronic products. However, when such a poly(arylene ether) resin is used alone, workability is poor due to a high melt viscosity thereof and the like. Accordingly, a poly(arylene ether) resin is blended with a polymer, such as polyamide, polyolefin, or polystyrene, to improve processability thereof. In particular, it was known that, when the poly(arylene ether) resin is blended with a polyamide resin, a resin composition having improved heat resistance and workability can be obtained. Accordingly, application of a modified poly(arylene ether) resin, as a blended poly(arylene ether)/polyamide resin, to components requiring high heat resistance, and the like has been attempted. However, the modified poly(arylene ether) resin also still exhibits many problems such as appearance deterioration, decrease of dimensional stability and impact strength, and change in properties due to moisture, because it is prepared by mixing poly(arylene ether) with polyamide.

Accordingly, research to address such problems has been actively underway. However, fundamental problems, i.e., a high specific gravity of polyamide and great change in physical properties due to moisture, of the poly(arylene ether)/polyamide blending resin remain unresolved.

RELATED ART DOCUMENT

Patent Document (Patent Document 1) JP 2905226 B2

DISCLOSURE

Technical Problem

Therefore, the present invention has been made in view of the above problems, and it is one object of the present invention to provide a modified poly(arylene ether) resin composition exhibiting reduction of property change due to moisture and providing low specific gravity and superior impact strength, heat resistance, and property balance.

It is another object of the present invention to provide a molded article manufactured using the modified poly(arylene ether) resin composition.

The above and other objects can be accomplished by the present invention described below.

Technical Solution

In accordance with one aspect of the present invention, provided is a modified poly(arylene ether) resin composition including 10 to 40% by weight of a poly(arylene ether) resin, 30 to 70% by weight of a polyamide resin, 1 to 20% by weight of a polyolefin based resin, 1 to 10% by weight of a compatibilizer, and 1 to 20% by weight of an impact modifier.

In accordance with another aspect of the present invention, provided is a molded article manufactured using the modified poly(arylene ether) resin composition.

Advantageous Effects

As apparent from the fore-going, the present invention advantageously provides a modified poly(arylene ether) resin composition exhibiting reduction of property change due to moisture and providing low specific gravity and superior impact strength, heat resistance, and property balance.

In addition, the present invention provides a molded article manufactured using the modified poly(arylene ether) resin composition.

BEST MODE

Hereinafter, the present invention is described in detail.

The present inventors have been continued research into a modified poly(arylene ether) resin composition prepared by blending a poly(arylene ether) resin with a polyamide resin. As a result of such research, the inventors investigated that, when a polyolefin based resin is added in a predetermined range to a conventional poly(arylene ether)/polyamide blending resin, the specific gravity of a resin composition is lowered and change in properties thereof due to moisture may be improved, thus completing the present invention based on such a discovery.

A modified poly(arylene ether) resin composition according to the present invention includes 10 to 40% by weight of a poly(arylene ether) resin, 30 to 70% by weight of a polyamide resin, 1 to 20% by weight of a polyolefin based resin, 1 to 10% by weight of a compatibilizer, and 1 to 20% by weight of an impact modifier.

The modified poly(arylene ether) resin composition refers to a poly(arylene ether) resin modified with a polyamide resin. Detailed description thereof is provided below.

The poly(arylene ether) resin of the present invention, but without being limited thereto, may be, for example, a single polymer represented by Formula 1 or 2 below; a copolymer including a polymer represented by Formula 1 or 2 below:

  [Formula 1]

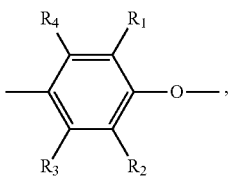  [Formula 2]

wherein $R_1$, $R_2$, $R_3$ and $R_4$, which is a substituent of an arylene group (Ar) or phenylene group, are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy or a nitro group, wherein Ar is a $C_7$ to $C_{20}$ arylene group. For example, $R_1$ and $R_2$ may be an alkyl group or a $C_1$ to $C_4$ alkyl group.

The poly(arylene ether) resin may be, for example, a poly(phenylene ether) resin.

The single polymer of the poly(arylene ether) resin is not specifically limited and may be particularly one or more selected from the group consisting of poly(2,6-dimethyl-1,4-phenylene) ether, poly(2,6-diethyl-1,4-phenylene) ether, poly(2-methyl-6-propyl-1,4-phenylene) ether, poly(2,6-dipropyl-1,4-phenylene) ether, poly(2-ethyl-6propyl-1,4-phenylene) ether, poly(2,6-dimethoxy-1,4-phenylene) ether, poly(2,6-dichloromethyl-1,4-phenylene) ether, poly(2,6-dibromomethyl-1,4-phenylene) ether, poly(2,6-diphenyl-1,4-phenylene) ether and poly(2,5-dimethyl-1,4-phenylene) ether.

In addition, the copolymer of the poly(arylene ether) resin is not specifically limited and may be particularly a copolymer of 2,6-dimethylphenol and 2,3,6-trimethylphenol, a copolymer of 2,6-dimethylphenol and o-cresol, a copolymer of 2,3,6-trimethylphenol and o-cresol, or the like.

The amount of the poly(arylene ether) resin may be, for example, 10 to 40% by weight, 20 to 35% by weight, or 30 to 35% by weight based on a total weight of the resin composition according to the present invention. Within this range, superior compatibility with polyamide and superior impact strength are provided.

The weight-average molecular weight of the poly(arylene ether) resin may be, for example, 10,000 to 100,000 g/mol, 10,000 to 70,000 g/mol, or 15,000 to 45,000 g/mol. Within this range, excellent processability and property balance are provided. The weight-average molecular weight may be measured by gel permeation chromatography.

The polyamide resin of the present invention is not specifically limited so long as it may be blended with the poly(arylene ether) resin. For example, the polyamide resin may be lactam, such as ε-caprolactam or ω-laurolactam; or amino acid, such as 6-aminocaproic acid, 11-aminoundecanoic acid, 12-aminododecanoic acid, or paraaminomethylbenzoic acid; or a polycondensate of two or more thereof.

For example, a monomer of the polyamide resin may be a mixture of an aliphatic, cycloaliphatic or aromatic dicarboxylic acid, such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, sberic acid, dodecane diacid, eicodionic acid, terephthalic acid, isophthalic acid, naphthalene dicarboxylic acid, 2-chloro terephthalic acid, 2-methyl terephthalic acid, 5-methyl isophthalic acid, 5-sodium sulfoisophthalic acid, hexahydroterephthalic acid, or diglycol acid; and an aliphatic, cycloaliphatic, or aromatic diamine, such as tetramethylene diamine, hexamethylene diamine, 2-methylpentamethylene diamine, undecamethylene diamine, dodecamethylene diamine, 2,2,4-trimethyl hexamethylene diamine, 2,4,4-trimethyl hexamethylene diamine, 5-methyl nonamethylene diamine, methaxylene diamine, paraxylylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, or aminoethyl piperazine, or a salt thereof.

The polyamide resin may be, for example, one or more selected from the group consisting of nylon 6, nylon 66, nylon 610, nylon 11, and nylon 12.

The relative viscosity of the polyamide resin may be, for example, 2.0 to 3.2 dl/g, 2.0 to 3.0 dl/g, or 2.4 to 2.7 dl/g. Within this range, superior compatibility and property balance are provided.

The polyamide resin may be included in an amount of, for example, 30 to 70% by weight, 35 to 60% by weight, or 35 to 55% by weight based on a total weight of the resin composition according to the present invention. Within this range, superior dimensional stability against moisture absorption and superior impact strength and flowability are provided.

The polyolefin based resin of the present invention may be, for example, a single olefin polymer or a copolymer including another vinyl monomer.

The polyolefin based resin may be, for example, a polyethylene polymer; a polypropylene polymer; or a copolymer of propylene and olefin that is one or more selected from the group consisting of ethylene, 1-butene, 1-pentene, 4-methyl-1-pentene, 1-hexene, 1-octene, and 1-decene. As another example, the polyolefin based resin may be one or more selected from the group consisting of a polypropylene polymer, a polypropylene copolymer, a propylene-alpha-olefin copolymer, a propylene-ethylene copolymer, a propylene-butene copolymer, and a propylene-ethylene-butene copolymer. In particular, when the polypropylene copolymer is used, excellent impact strength and heat resistance are provided.

The polyolefin based resin may be included in an amount of, for example, 1 to 20% by weight, 5 to 20% by weight, or 5 to 15% by weight based on a total weight of the resin composition according to the present invention. Within this range, heat resistance and impact balance of the resin composition may be optimized and the specific gravity thereof may be reduced.

The melt index (MI, under conditions of 230° C. and 2.16 kg) of the polyolefin based resin may be, for example, 0.2 to 100 g/10 min, 3 to 90 g/10 min, or 30 to 100 g/10 min. Within this range, superior heat resistance and property balance are provided.

The polyolefin based resin may be prepared according to a conventional method. In particular, the polyolefin based resin may be a copolymer prepared by polymerizing olefin with alpha-olefin through bulk, slurry, or gas phase polymerization in the presence of a suitable catalyst.

The another vinyl monomer is not specifically limited so long as it is a vinyl monomer which is generally used as a comonomer upon preparation of polyolefin.

The compatibilizer of the present invention is not specifically limited so long as it is a compatibilizer which is used in a polymer blending resin. For example, the compatibilizer may be a reactive or unreactive compatibilizer.

The reactive compatibilizer reacts during being heated and kneaded in an extruder, and thus, exhibits great effect even when it is added in a small amount. On the other hand, the unreactive compatibilizer, which functions like an emulsifier, may reduce a risk of property deterioration due to side reactions, etc. and facilitates kneading and molding.

The reactive compatibilizer may be, for example, a block or graft copolymer modified with an unsaturated carboxylic acid or an unsaturated carboxylic acid anhydride.

The modified block copolymer or the modified graft copolymer may be, for example, one or more selected from the group consisting of poly(arylene ether) modified with unsaturated carboxylic acid and polyolefin modified with an unsaturated carboxylic acid anhydride.

The polyolefin or the poly(arylene ether) is not specifically limited so long as it may be modified with an unsaturated carboxylic acid or an unsaturated carboxylic acid anhydride.

The unsaturated carboxylic acid may be, for example, one or more selected from the group consisting of citric acid, malic acid, and agaric acid.

As another example, the unsaturated carboxylic acid may be unsaturated dicarboxylic acid. In another embodiment, the unsaturated carboxylic acid may be one or more selected from the group consisting of fumaric acid, maleic acid, and itaconic acid.

The unsaturated carboxylic acid anhydride may be, for example, an unsaturated dicarboxylic acid anhydride. In another embodiment, the unsaturated carboxylic acid anhydride may be a maleic anhydride.

The glass transition temperature (Tg) of the reactive compatibilizer may be, for example, 150 to 250° C., 180 to 250° C., or 180 to 210° C. Within this range, superior heat resistance is provided.

In another embodiment, the melting point (Tm) of the reactive compatibilizer may be 80 to 200° C., 90 to 180° C., or 100 to 150° C. Within this range, superior mechanical properties and property balance are provided.

The unreactive compatibilizer may be, for example, a block copolymer or a graft copolymer. In another embodiment, the unreactive compatibilizer may be a styrene-ethylene-butylene-styrene block copolymer, a styrene-ethylene block copolymer, or a polypropylene-polyamide graft copolymer.

The compatibilizer may be included, for example, in an amount of 1 to 10% by weight, 1 to 8% by weight, or 3 to 8% by weight based on a total weight of the resin composition according to the present invention. Within this range, superior property balance and processability are provided.

The impact modifier of the present invention is not specifically limited so long as it may be used in a poly(arylene ether) resin composition. For example, the impact modifier may be one or more selected from the group consisting of a styrene-based impact modifier and an olefin-based impact modifier.

The styrene-based impact modifier may be one or more selected from the group consisting of, for example, a styrene-butadiene copolymer, a styrene-ethylene-propylene copolymer, a styrene-isoprene copolymer, an alpha-methyl styrene-butadiene copolymer, a styrene-butadiene-styrene copolymer, a styrene-ethylene-propylene-styrene copolymer, a styrene-ethylene-butylene-styrene copolymer, a styrene-(ethylene-butylene/styrene copolymer)-styrene copolymer, a styrene-isoprene-styrene copolymer, and an alpha-methyl styrene-butadiene-alpha-methyl styrene copolymer and modified polymers obtained by selectively modifying the same with a maleic anhydride. In particular, when the styrene-ethylene-butylene-styrene copolymer or the styrene-ethylene-butylene-styrene copolymer modified with a maleic anhydride is used, superior impact strength and property balance are provided.

The specific gravity of the styrene-based impact modifier may be, for example, 0.8 to 0.99, 0.85 to 0.95, or 0.88 to 0.90. Within this range, the specific gravity of the resin composition is decreased and superior impact strength is provided.

The shore A hardness of the styrene-based impact modifier may be, for example, 30 to 70, 40 to 60, or 45 to 50. Within this range, superior impact strength and property balance are provided.

The olefin-based impact modifier may be, for example, a polyolefin or a polyolefin modified with a maleic anhydride. In another embodiment, the olefin-based impact modifier may be one or more selected from the group consisting of polyethylene, polypropylene, an ethylene-propylene copolymer and modified polymers obtained by selectively modifying the same with a maleic anhydride.

The impact modifier may be included in an amount of, for example, 1 to 20% by weight, 3 to 15% by weight, or 5 to 10% by weight based on a total weight of the resin composition according to the present invention. Within this range, superior impact strength and property balance are provided.

The modified poly(arylene ether) resin composition may further include, for example, 0.1 to 5% by weight, or 1 to 4% by weight, or 2 to 3% by weight of an additive.

The additive may be one or more selected from the group consisting of, for example, an antioxidant, a lubricant, a thermal stabilizer, a flame retardant, an antistatic agent, a filler, a cross-linking agent, and a coloring agent.

The specific gravity of the modified poly(arylene ether) resin composition may be, for example, 1.08 or less, 1.08 to 1.03, or 1.08 to 1.04.

The impact strength of the modified poly(arylene ether) resin composition may be, for example, 7 kgf·cm/cm$^2$ or more, 13 kgf·cm/cm$^2$ or more, or 13 to 35 kgf·cm/cm$^2$.

The heat deformation temperature (HDT) of the modified poly(arylene ether) resin composition may be, for example, 140° C. or more or 140 to 200° C.

In addition, the molded article of the present invention is manufactured using the modified poly(arylene ether) resin composition.

The aforementioned preferred embodiments have been provided to help understanding of the present invention. However, the preferred embodiments are provided only to illustrate the present invention, and those skilled in the art will appreciate that various modifications, additions and substitutions are possible, without departing from the scope and spirit of the invention. Therefore, it is obvious that the modifications, additions and substitutions are included in the scope of the present invention.

EXAMPLES

First, constituents used in each of examples and comparative examples of the present invention are as follows.

PPE: Poly(2,6-dimethyl-phenyl) ether was used.

PA 1: Nylon 66 having a relative viscosity of 2.4 dl/g was used.

PA 2: Nylon 66 having a relative viscosity of 2.7 dl/g was used.

PP 1: Polypropylene having a melt index of 90 g/10 min (230° C., 2.16 kg) was used.

PP 2: Polypropylene having a melt index of 30 g/10 min (230° C., 2.16 kg) was used.

PP 3: Polypropylene having a melt index of 180 g/10 min (230° C., 2.16 kg) was used.

*Compatibilizer 1: poly(phenylene ether) modified with fumaric acid having a glass transition temperature (Tg) of 180 to 210° C. was used.

Compatibilizer 2: polypropylene modified with a maleic anhydride having a melting point (Tm) of 100 to 150° C. was used.

Impact modifier: A styrene-ethylene-butylene-styrene copolymer having a specific gravity of 0.89 and a Shore A hardness of 47 was used.

Additive: Generally used additives, such as polystyrene, an antioxidant, and a lubricant, were used.

Examples 1 to 8

The constituents of each of Examples 1 to 8 were mixed in contents (% by weight) summarized in Table 1 below by means of a mixer. A resultant mixture was melted, kneaded, and extruded at 270 to 320° C. by means of a twin-screw extruder (L/D=44, Φ=40), thereby preparing a pellet-shape resin composition. Subsequently, the obtained pellet-shape resin composition chip was dried at 80 to 120° C. for five hours or more. The dried pellet-shape resin composition chip was prepared into a specimen for measuring various properties by means of a screw extruder heated to 280 to 300° C. and a mold at 80 to 100° C.

The properties of the prepared specimen were measured according to the following methods. Results are summarized in Table 1 below.

Comparative Examples 1 to 9

Experiments were carried out in the same manner as in Example 1, except that the constituents of each of Comparative Examples 1 to 9 were used in contents summarized in Table 2 below (% by weight).

Experimental Example

The properties of the modified poly(arylene ether) resin composition specimen obtained according to each of Examples 1 to 8 were measured according to the following methods. Results are summarized in Table 1 below. The properties of the modified poly(arylene ether) resin composition specimen obtained according to each of Comparative Examples 1 to 9 were measured according to the following methods. Results are summarized in Table 2 below.

Measurement Methods

Melt index (g/10 min): Measured according to ASTM D1238 standard test method (under conditions of 230° C. and 2.16 kg).

Relative viscosity (dl/g): A sample was dissolved in 96% sulfuric acid, and the relative viscosity thereof was measured by means of an Ubbelohde viscometer.

Specific gravity: Measured by means of a hydrometer according to ASTM D792.

Impact strength (Notched Izod, kgf·cm/cm$^2$): Measured using a ¼" specimen according to ASTM D256 standard test method.

Heat deformation temperature (HDT, ° C.): Measured using a ¼" specimen according to ASTM D648 standard test method.

TABLE 1

| Classification | (Unit) | Examples | | | | | | | |
|---|---|---|---|---|---|---|---|---|---|
| | | 1 | 2 | 3 | 4 | 5 | 6 | 7 | 8 |
| PPE | (% by weight) | 33 | 33 | 33 | 33 | 30 | 33 | 33 | 20 |
| PA 1 | | 44 | 43 | 44 | 39 | 40 | | | |
| PA 2 | | | | | | | 49 | 45 | 63 |
| PP 1 | | | | 10 | 10 | | 5 | 10 | 5 |
| PP 2 | | 10 | 10 | | | | | | |
| PP 3 | | | | | 10 | 15 | 15 | | |
| Compatibilizer 1 | | 5 | 5 | 5 | 5 | 7 | 5 | 5 | 5 |
| Compatibilizer 2 | | | 1 | | | | | 1 | 1 |
| Impact modifier | | 6 | 6 | 6 | 6 | 6 | 6 | 4 | 4 |
| Additive | | 2 | 2 | 2 | 2 | 2 | 2 | 2 | 2 |
| Specific gravity | — | 1.06 | 1.06 | 1.06 | 1.04 | 1.04 | 1.08 | 1.06 | 1.08 |
| Impact strength | (kgf · cm/cm$^2$) | 22 | 24 | 24 | 18 | 17 | 25 | 13 | 15 |
| Heat deformation temperature | (° C.) | 183 | 180 | 182 | 151 | 147 | 185 | 185 | 185 |

TABLE 2

| Classification | (Unit) | Comparative Examples | | | | | | | | |
|---|---|---|---|---|---|---|---|---|---|---|
| | | 1 | 2 | 3 | 4 | 5 | 6 | 7 | 8 | 9 |
| PPE | (% by weight) | 33 | 33 | 33 | 35 | 50 | 40 | 40 | 5 | 45 |
| PA 1 | | 54 | 30 | 43 | 45 | 30 | 40 | 48 | 80 | 25 |
| PA 2 | | | | | | | | | | |
| PP 1 | | | | | 10 | | | 10 | 10 | 20 |
| PP 2 | | | 23 | | | 5 | | | | |
| PP 3 | | | | 10 | | | | | | |
| Compatibilizer 1 | | 5 | 5 | 5 | | 5 | 13 | | 3 | 4 |
| Compatibilizer 2 | | | 1 | 1 | | | | | | 4 |
| Impact modifier | | 6 | 6 | 6 | 8 | 8 | 5 | | | |
| Additive | | 2 | 2 | 2 | 2 | 2 | 2 | 2 | 2 | 2 |
| Specific gravity | — | 1.09 | 1.03 | 1.06 | 1.05 | 1.09 | 1.09 | 1.06 | 1.07 | 1.03 |
| Impact strength | (kgf · cm/cm$^2$) | 15 | 6 | 6 | 5 | 5 | 5 | 5 | 4 | 6 |
| Heat deformation temperature | (° C.) | 183 | 100 | 160 | 170 | 188 | 190 | 175 | 190 | 105 |

As shown in Table 1, it can be confirmed that all of the specimens of Examples 1 to 8 according to the present invention exhibit both low specific gravity and high heat resistance. In addition, it can be confirmed that all of the specimens of Examples 1 to 8 exhibit high impact strength and thus have superior property balance.

On the other hand, it can be confirmed that, as shown in Table 2, the specimen of Comparative Example 1, to which polypropylene was not added, exhibits a considerably high specific gravity, and the specimen of Comparative Example 2, to which a large amount of polypropylene was added, exhibits considerably decreased impact strength and heat resistance.

In addition, it can be confirmed that, in Comparative Example 3 to which polypropylene having a high melt index (MI) was added, Comparative Example 4 to which a compatibilizer was not added, and Comparative Example 7 to which a compatibilizer and an impact modifier were not added, impact strength is considerably decreased.

In addition, it can be confirmed that, in Comparative Example 5, in which a large amount of poly(phenylene ether) was used, and Comparative Example 6, to which polypropylene was not added and a large amount of a compatibilizer was added, a specific gravity is high and impact strength is considerably decreased.

Further, it can be confirmed that, in Comparative Example 8 in which a small amount of poly(phenylene ether) was used, impact strength is very poor. In addition, it can be confirmed that, in Comparative Example 9 in which a large amount of poly(phenylene ether) was used and to which polyamide was not sufficiently added, impact strength is very poor and a heat deformation temperature is very low.

From these results, it can be confirmed that, in the comparative examples outside the composition ratio range of the present invention, overall property balance thereof is considerably decreased.

In conclusion, the modified poly(arylene ether) resin composition of the present invention is prepared by mixing a poly(arylene ether) resin, a polyamide resin, a polyolefin based resin, and a compatibilizer, whereby the specific gravity of the resin composition is lowered and property change due to moisture is minimized. Accordingly, the present invention completed a modified poly(arylene ether) resin composition exhibiting reduction of property change due to moisture and providing low specific gravity and superior impact strength, heat resistance, and property balance and a molded article manufactured using the same.

The invention claimed is:

1. A modified poly(arylene ether) resin composition, comprising 10 to 40 % by weight of a poly(arylene ether) resin, 30 to 70% by weight of a polyamide resin, 1 to 20% by weight of a polypropylene having a melt index (MI) of 30 to 100 g/10 min, 5 to 10% by weight of poly(phenylene ether) modified with fumaric acid, and 1 to 20% by weight of an impact modifier.

2. The modified poly(arylene ether) resin composition according to claim 1, wherein the poly(arylene ether) resin is a single polymer represented by Formula 1 or 2 below; or a copolymer comprising a polymer represented by Formula 1 or 2 below:

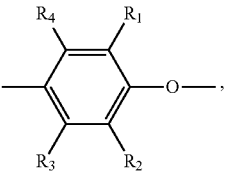

wherein $R_1$, $R_2$, $R_3$ and $R_4$, which is a substituent of an arylene group (Ar) or phenylene group, are each independently or simultaneously hydrogen, chlorine, bromine, iodine, methyl, ethyl, propyl, allyl, phenyl, methylbenzyl, chloromethyl, bromomethyl, cyanoethyl, cyano, methoxy, phenoxy or a nitro group, wherein Ar is a $C_7$ to $C_{20}$ arylene group.

3. The modified poly(arylene ether) resin composition according to claim 1, wherein the poly(arylene ether) resin is a poly(phenylene ether) resin.

4. The modified poly(arylene ether) resin composition according to claim 1, wherein the poly(arylene ether) resin has a weight-average molecular weight of 10,000 to 100,000 g/mol.

5. The modified poly(arylene ether) resin composition according to claim 1, wherein the polyamide resin has a relative viscosity (RV) of 2.0 to 3.2 dl/g.

6. The modified poly(arylene ether) resin composition according to claim 1, wherein the impact modifier is one or more selected from the group consisting of a styrene-based impact modifier and an olefin-based impact modifier.

7. The modified poly(arylene ether) resin composition according to claim 6, wherein the impact modifier is one or more selected from the group consisting of a styrene-butadiene-styrene copolymer, a styrene-ethylene-butylene-styrene copolymer, polyolefin modified with a maleic anhydride, and a styrene-ethylene-butylene-styrene copolymer modified with a maleic anhydride.

8. The modified poly(arylene ether) resin composition according to claim 1, further comprising 0.1 to 5% by weight of an additive.

9. The modified poly(arylene ether) resin composition according to claim 8, wherein the additive is one or more selected from the group consisting of an antioxidant, a lubricant, a thermal stabilizer, a flame retardant, an antistatic agent, a filler, a cross-linking agent, and a coloring agent.

10. The modified poly(arylene ether) resin composition according to claim 1, wherein a specific gravity of the modified poly(arylene ether) resin composition is 1.08 or less.

11. The modified poly(arylene ether) resin composition according to claim 1, wherein an impact strength of the modified poly(arylene ether) resin composition is 9 kgf·cm/cm$^2$ or more.

12. The modified poly(arylene ether) resin composition according to claim 1, wherein a heat deformation temperature (HDT) of the modified poly(arylene ether) resin composition is 140° C. or more.

13. A molded article manufactured using the modified poly(arylene ether) resin composition according to claim 1.

* * * * *